July 22, 1947.  C. E. KERR  2,424,241
GAUGE FOR GREEN CORN CUTTERS
Filed Feb. 28, 1944
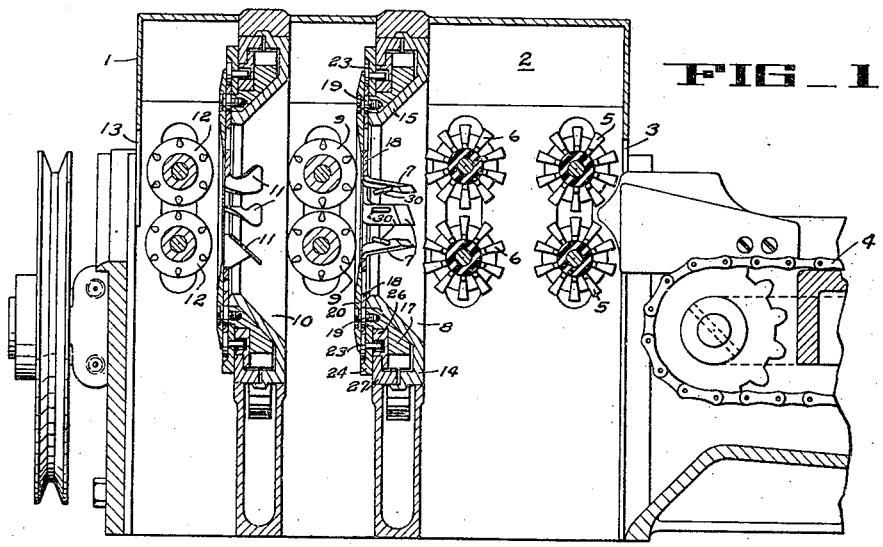
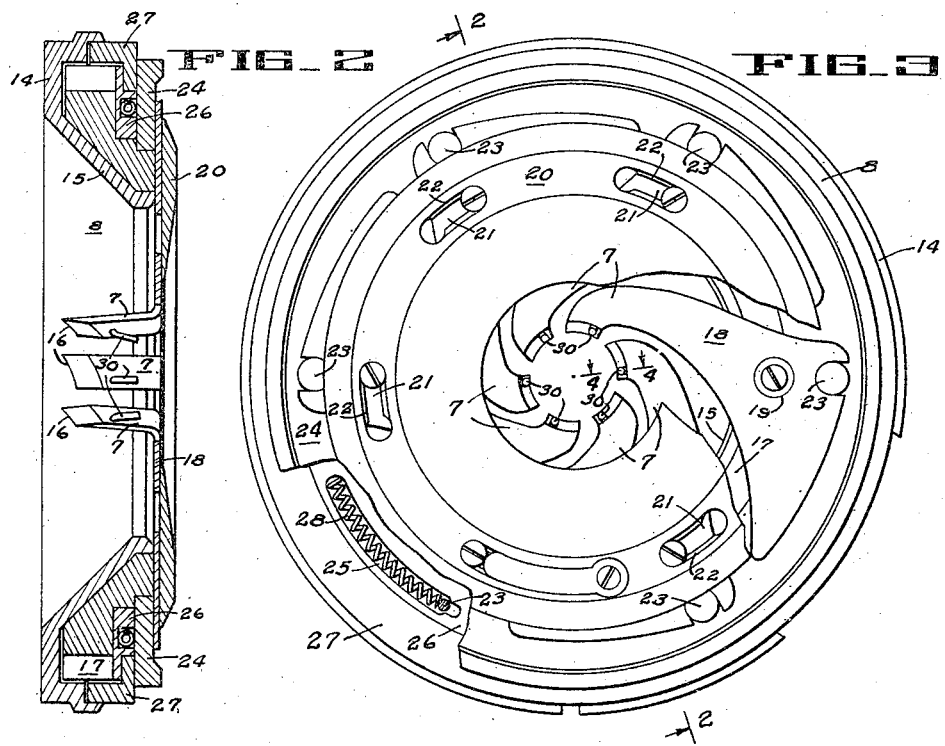
Inventor
CHARLES E. KERR.
By Philip G. Minnis.
Attorney Patented July 22, 1947

2,424,241

UNITED STATES PATENT OFFICE 2,424,241

GAUGE FOR GREEN CORN CUTTERS

Charles E. Kerr, Hoopeston, Ill., assignor to Food Machinery Corporation, San Jose, Calif., a corporation of Delaware Application February 28, 1944, Serial No. 524,233

10 Claims. (Cl. 130—9)

This invention relates to green corn cutting machines of the rotary cutter type and is particularly concerned with the provision of an improved form of gauging means for gauging the depth of cut of the cutter knives from the cob surface.

It will be understood that in the operation of green corn cutting machines it is necessary to regulate the depth of cut taken by the knives so that they will shear off the kernels to the desired depth and at the same time not remove cob shavings or an excessive amount of chaff along with the cut kernels. This is commonly accomplished by means of gauges operatively associated with the knives and arranged to bear either on the outer surfaces of the uncut kernels just ahead of the knives or on the cob surface immediately to the rear of the knife edges.

One of the difficulties heretofore encountered in the design of gauges intended for operation on the cob surface has been that of providing the gauges with sufficient bearing area to prevent them from digging into the cobs while at the same time forming them to avoid excessive scraping of the cob surfaces. Such scraping is highly undesirable when cutting whole grain style corn in which only the whole kernels, without any scrapings or chaff, are wanted.

It is one of the objects of the present invention to provide a green corn cutter of the rotary cutter type with an improved gauging mechanism adapted to gauge the depth of cut of the knives from the cob surface with a minimum of digging or scraping action.

It is also an object to provide a cutter knife for use in green corn cutting machines of the rotary cutter type, such knife being provided with an improved form of gauge for effectively gauging the depth of cut of the knife from the cob surface with a minimum of digging or scraping action.

These and other objects and advantages will become more apparent from the following description taken in conjunction with the accompanying drawings wherein:

Fig. 1 is a vertical longitudinal section through the cutter assembly and cutting chamber of a rotary type corn cutter embodying my present invention.

Fig. 2 is an enlarged vertical section through the cutter head shown in Fig. 1.

Fig. 3 is a rear elevation of the cutter head shown in Figs. 1 and 2, certain portions being broken away for purposes of illustration.

Fig. 4 is an enlarged cross section through one of the cutter knives as viewed along the line 4—4 of Fig. 3.

Fig. 5 is a view similar to that of Fig. 4 but illustrating a modified form of gauge runner.

Although it should be understood that my invention is of general application to various designs of rotary type corn cutters, I have chosen, for purposes of this disclosure, to illustrate it as it may be employed in the machine disclosed in U. S. Letters Patent No. 2,323,092 issued June 29, 1943, upon a prior application filed by me, the gauging mechanism of the present invention being substituted for that shown in the patent. Since, however, the construction and operation of the machine as a whole is illustrated and described in minute detail in the patent referred to, it is deemed unnecessary to do so herein and I have therefore illustrated, and shall hereinafter describe, only so much of the machine as may be necessary for a proper understanding of the present invention.

Referring first to Fig. 1 of the accompanying drawings, the reference numeral 1 indicates a housing which forms a cutting chamber 2 therewithin. The housing is open at its bottom for the gravity discharge of the cut kernels and also has an opening 3 in its front wall through which the previously husked ears of corn are introduced.

The ears are delivered endwise into the chamber 2 through the opening 3 by means of an endless chain conveyer 4 and as they enter the chamber they are grasped between a pair of resiliently separable power driven feed rolls 5 and delivered into a second set of similar feed rolls 6. These two sets of feed rolls cooperate to axially align the ears with, and feed them through, a circular cutting opening formed by an annularly arranged series of knives 7 mounted on a rapidly rotating knife carrier which forms part of a cutter head generally indicated at 8.

As the ears are delivered into the cutter head 8 the kernels are sheared from the cob by the rotating knives 7 and upon emergence from the rear side of the head the cobs are grasped between another pair of resiliently separable power driven feed rolls 9 which have a greater peripheral speed than that of the feed rolls 5 and 6. This speed differential may be obtained either by driving the rolls 9 faster than the rolls 5 and 6 or by making them smaller in diameter, and the purpose in so doing is to accelerate the cobs as they pass from the cutting head so as to move them out of the way of those following and make it easier to push the latter through the cutter head.

The feed rolls 9 feed the cobs through a scraper head 10 provided with an annularly arranged revolving series of scraper blades 11, and the scraped cobs are received between a pair of resiliently separable power driven discharge rolls 12 which discharge them from the housing through an opening 13 in its rear wall. These discharge rolls also have a greater peripheral speed than that of the feed rolls 9 in order to further space the cobs and the speed differential may be accomplished in the same manner as is described above in connection with the feed rolls 9.

The scraper head 10 is identical in construction with the cutter head 8 except that scraper blades 11 are substituted for the knives 7. As will be understood by those skilled in the art, the scraper head is employed when the machine is used for preparing cream style corn but may be removed from the machine when cutting whole grain style corn.

Referring now to Figs. 2 and 3 of the drawings, it will be observed that the cutter head 8 comprises a stationary annular bearing 14 having a conical throat 15 which forms a central opening through the head and surrounds the cutting edges 16 of the knives 7. Rotatably journalled on the inner surface of the conical throat 15 is a ring gear 17 which is driven by means not shown in the drawings but fully illustrated and described in U. S. Letters Patent No. 2,323,092 hereinabove referred to.

The ring gear 17 serves as a carrier for the knives 7 which are provided with angularly projecting arms or shanks 18 journalled on pivot pins 19 screwed into the rear face of the gear. The knife shanks are held on the pivot pins 19 by means of a bevelled retainer ring 20 provided with slots 21 through which the pins project and ledges 22 which engage the undersides of heads on the pins so as to lock the ring in place.

The outer ends of the knife shanks are notched to receive the heads of pins 23 which are fastened to an equalizing ring 24 and project therethrough into short channels 25 in an adjusting ring 26 which is held against the ring gear 17 by a stationary retainer ring 27 secured by screws (not shown) to the bearing 14. The adjusting ring 26 is adjustably locked to the ring gear 17 for rotation therewith and the equalizing ring 24 also rotates with the ring gear but is freely rotatable with respect thereto.

By the arrangement described it will be observed that the knives 7 are not only pivoted to the ring gear 17 for movement toward and away from the axis of the cutter head, but they are also interconnected for movement in unison by means of the pins 23 and equalizing ring 24 so that they open and close in iris fashion. The knives are normally held in closed position by one or more small coil springs 28 disposed in the channels 25 and bearing against the inner ends of the pins 23, but open up by the pressure of an ear of corn when the latter is thrust endwise into the circular cutting opening defined by the knives.

In accordance with the present invention I provide the knives with depth of cut gauges in the form of gauge runners 30 mounted beneath the blades of the knives just rearwardly of their cutting edges. As best seen in Fig. 4 each runner has one end bent upwardly and this portion of the runner rotatably projects through a bearing opening 31 in the knife blade and is provided with a head 32, similar to the head on a nail, to hold the runner on the blade. In fact I have found that a common standard six penny nail cut to suitable length and then projected through the opening 31 and bent into the shape shown, will serve the purpose very admirably. By bending the runner immediately below the knife blade any up and down play between the runner and the blade can be prevented or limited to an inconsequential amount. If desired, a collar 33 can be secured to the runner just beneath the blade surface to limit or prevent any such play, such a modification being illustrated in Fig. 5 of the drawings.

It will be observed that by the construction just described, the forward end of the runner is pivoted or swivelled to the knife blade so that the runner is free to swing angularly relatively to the cutting edge of the knife after the manner of a caster, and this is an important feature of my invention as will now be explained.

It will be apparent that as the end of an ear of corn is introduced into the circular cutting opening defined by the knives 7, the latter will immediately begin to shear the kernels from the cob and as the cob passes between the knives its surface is engaged by the runners 30 which project inwardly of the cutting circle of the knives. The runners thereupon travel along the surface of the cob and hold the knife edges at the desired clearance from the cob, the amount of clearance depending of course upon the setting of the runners, i. e., the distance they project beneath the blade.

By reason of the rotation of the knives and the forward movement of the ear therepast, the knives travel in a spiral path around the cob and the lead of this spiral path depends upon the size of the ear. Thus when the knives are opened up to accommodate the passage of a large diameter ear their peripheral speed is greater than when they are opened to a lesser amount for the accommodation of a smaller ear, and the lead of the spiral path which they travel over the cob changes accordingly.

The lead of the spiral path referred to is also affected by the action of the feed rolls 9 since as above pointed out these rolls have a greater peripheral speed than that of the rolls 5 and 6 and they therefore accelerate the ear as soon as the cob passes far enough through the cutter head to be grasped by them.

It may now readily be seen that if the runners 30 were mounted in fixed position relative to the knife blades it would be impossible for them to always remain aligned with the changing spiral path of the knives and consequently they would have an undesirable sidewise scraping action over the cob surface a large percentage of the time. By pivotally mounting the runners, however, as contemplated by my invention, it will be apparent that they are perfectly free to change their angular position with respect to the knife edges, and their caster action causes them to automatically assume a position at all times in line with the spiral path of travel of the knives. Hence they are prevented from scraping sidewise over the cob.

It will also be noted that the upward bend at the forward end of the runner is such that the corner is curved at 34 after the manner of a sled runner so that no scraping or gouging takes place at this point. The cylindrical shape of the runner also provides it with a rounded bottom so as to further minimize danger of scraping. At the same time the length of the runner may be made such as to afford adequate bearing area so that it cannot dig into the cob and thereby adversely affect the gauging operation.

A further advantage of the gauge runners comprehended by my invention is that they may be made of material (such as a common soft steel wire nail, for example) that is sufficiently stiff or rigid as to hold its shape under the operating conditions met with in a corn cutter, and yet is sufficiently flexible that it can readily be bent by the use of a hammer or pliers so as to alter the setting of the runners and thereby change the depth of cut of the knives. Thus by bending the runner downwardly into the position indicated by dotted lines in Figs. 4 and 5 the depth of cut of the knife can be decreased, and by bending the runner in the opposite direction the depth of cut can be increased. I have found that a common standard nail of a size ranging from fourpenny to eightpenny may be used with satisfactory results.

Having now described my invention and in what manner the same may be used, what I claim as new and desire to protect by Letters Patent is:

1. A green corn cutting knife comprising a blade having a cutting edge, and a gauge runner disposed beneath said blade and extending rearwardly of said cutting edge for engagement with the cob to gauge the depth of cut of the knife as the latter severs the kernels from the cob, the forward end of said runner being pivotally secured to the blade whereby the runner is free to swing angularly relative to said cutting edge.

2. A green corn cutting knife comprising a blade having a cutting edge, and a gauge bar having a rounded bottom disposed beneath said blade for gliding engagement with the cob to gauge the depth of cut of the knife as the latter severs the kernels from the cob, the forward end of said bar being pivotally secured to the blade whereby the bar is free to swing angularly relative to said cutting edge.

3. A green corn cutting knife comprising a blade having a cutting edge, and an elongated gauge runner disposed beneath said blade for engagement with the cob to gauge the depth of cut of the knife as the latter severs the kernels from the cob, the forward end of said runner being curved upwardly and pivotally secured to the blade whereby the runner is free to swing angularly relative to said cutting edge.

4. A green corn cutting knife comprising a blade having a cutting edge, and a cylindrical gauge runner disposed beneath said blade for engagement with the cob to gauge the depth of cut of the knife as the latter severs the kernels from the cob, the forward end of said runner being bent upwardly and pivotally secured to the blade whereby the runner is free to swing angularly relative to said cutting edge.

5. A green corn cutting knife comprising a blade having a cutting edge, and a gauge runner disposed beneath said blade for engagement with the cob to gauge the depth of cut of the knife as the latter severs the kernels from the cob, the forward end of said runner being pivotally secured to the blade whereby the runner is free to swing angularly relative to said cutting edge, said runner being formed of stiffly flexible material to enable it to be bent toward and away from said blade to vary the depth of cut of the knife.

6. In a green corn cutting machine having a rotary knife carrier provided with a central opening to permit ears of corn to be passed endwise therethrough, and a kernel cutting knife mounted on said carrier for rotation therewith and for movement toward and away from the axis of rotation of the carrier, the improvement comprising: a gauge rod carried by said knife rearwardly of its cutting edge and in position to slidingly engage the cob of an ear of corn passing through said opening to gauge the depth of cut of the knife as the latter severs the kernels from the cob, the forward end of said rod being pivotally secured to said knife whereby the rod is free to swing angularly relative to said cutting edge.

7. In a green corn cutting machine having a rotary knife carrier provided with a central opening to permit ears of corn to be passed endwise therethrough, a kernel cutting knife mounted on said carrier for rotation therewith and for movement toward and away from the axis of rotation of the carrier, means for feeding ears of corn through said opening to cause said knife to shear the kernels therefrom, and means for receiving the cobs emerging through said opening and withdrawing them at an accelerated rate, the improvement comprising: an elongated gauge runner carried by said knife rearwardly of its cutting edge and in position to tangentially engage the cob of an ear of corn passing through said opening to gauge the depth of cut of the knife as the latter severs the kernels from the cob, the forward end of said runner being pivotally secured to said knife whereby the runner is free to swing angularly relative to said cutting edge.

8. In a green corn cutter including means for advancing an ear of corn lengthwise and a rotary blade having a cutting edge for shearing the kernels from said ear of corn, a self-aligning depth of cut gauge associated with said rotary blade comprising an elongated member for engaging the cob of said ear of corn to space said cutting edge a predetermined distance from said cob, and means for pivotally mounting said elongated member relative to said rotary blade whereby the elongated member is free to swing into an angular position commensurate to the angle of inclination of the spiral path of said cutting edge relative to the advancing ear of corn.

9. In a green corn cutter including means for advancing an ear of corn endwise therethrough, a knife movable toward the axis of movement of said ear of corn and having a cutting edge, and means for effecting relative rotation of said ear of corn and said knife with respect to each other whereby said cutting edge will shear the kernels from the cob of said ear of corn; the combination with said knife of a self-aligning depth of cut gauge comprising an elongated member disposed beneath said knife to engage the cob of said ear of corn, and means for pivotally mounting the forward end of said elongated member on said knife whereby the elongated member will automatically assume an angular position corresponding to the angle of inclination of the spiral path of the cutting edge relative to said ear of corn as determined by the diameter of the cob thereof.

10. In a green corn cutting machine including means for feeding ears of corn endwise into the same in successive order, a rotary blade substantially parallel to the major axis of said ear of corn and having a cutting edge disposed to shear the kernels from the cob of said ear of corn as it is advanced past said blade, and means for subsequently drawing the ear of corn being shorn past said blade at an accelerated rate to make way for a succeeding ear of corn; the combination with said blade of a self-aligning depth of cut gauge comprising a rod rotatably mounted in said blade and bent below the latter to drag over the cob of said ear of corn at an angle conforming to the angle of inclination of the spiral path of said cutting edge relative to the ear of corn as determined by the rate of movement of the same past said blade.

CHARLES E. KERR.

REFERENCES CITED

The following references are of record in the file of this patent:

UNITED STATES PATENTS

| Number | Name | Date |
|---|---|---|
| 2,029,344 | Sheldon | Feb. 4, 1936 |
| 2,169,963 | Kerr | Aug. 15, 1939 |
| 2,323,092 | Kerr | June 29, 1943 |
| 943,249 | Jahansan | Dec. 14, 1909 |
| 968,538 | Case | Aug. 30, 1910 |